United States Patent [19]
Hilton et al.

[11] 4,185,894
[45] Jan. 29, 1980

[54] DIELECTRIC REFLECTOR FOR SELECTIVE WAVELENGTH REFLECTION

[75] Inventors: Paul G. Hilton, Phoenix, Ariz.; Paul F. Robusto, Oceanside; Craig P. Stephens, Carlsbad, both of Calif.

[73] Assignee: Hughes Aircraft Company, Culver City, Calif.

[21] Appl. No.: 886,026

[22] Filed: Mar. 13, 1978

[51] Int. Cl.² .............................................. G02F 1/13
[52] U.S. Cl. ............................ 350/338; 350/166; 350/336
[58] Field of Search ............... 350/338, 339, 336, 334, 350/164, 166

[56] References Cited
U.S. PATENT DOCUMENTS

| | | | |
|---|---|---|---|
| 3,736,047 | 5/1973 | Gelber et al. | 350/338 |
| 3,910,681 | 10/1975 | Elliott et al. | 350/338 |
| 4,012,119 | 3/1977 | Adams et al. | 350/338 |

*Primary Examiner*—Edward S. Bauer
*Attorney, Agent, or Firm*—W. H. MacAllister; D. C. Keaveney; G. L. Cline

[57] ABSTRACT pg,1 There is disclosed a dielectric reflector for selective wavelength reflection which comprises an alternately deposited series of thin films of silicon and silicon dioxide layers respectively arranged in an alternating sequence of at least one layer of each type of material. This reflector is suitable for use on the reflecting electrode of a liquid crystal video display panel fabricated on a semiconductor substrate. The use of the dielectric reflector in place of other types of reflectors increases the available reflectivity and permits a preselected color or wavelength to be preferentially reflected. The polysilicon layer of the dielectric reflector is doped with p-type or n-type impurities such as boron or phosphorus to make this layer electrically conductive.

7 Claims, 2 Drawing Figures

Fig. 1.
PRIOR ART
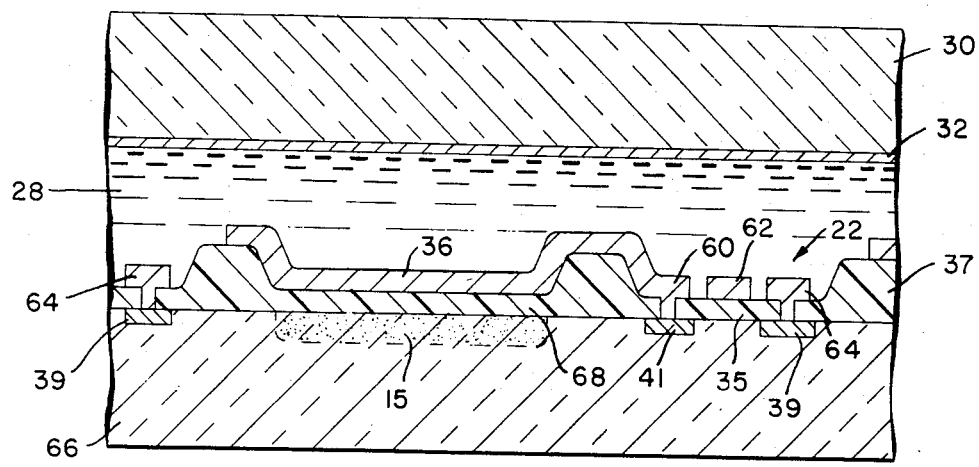
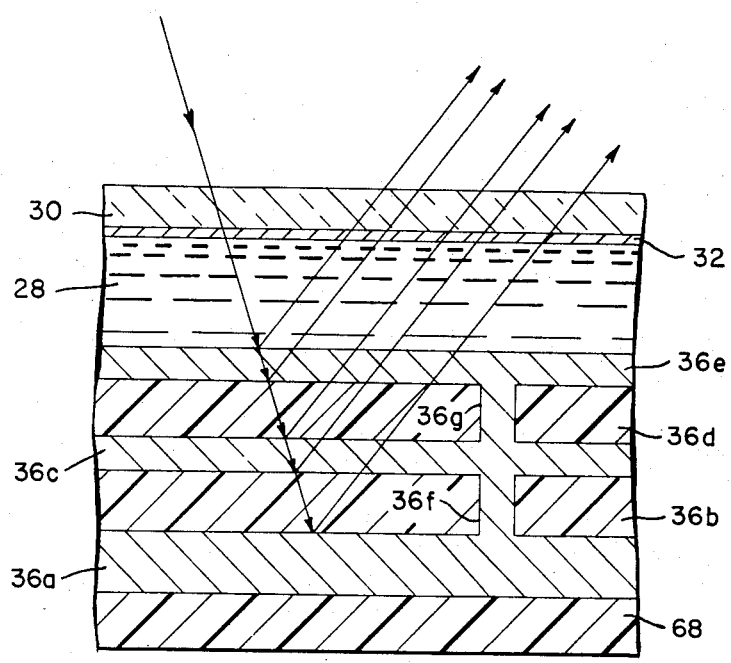
Fig. 2.

DIELECTRIC REFLECTOR FOR SELECTIVE WAVELENGTH REFLECTION

BACKGROUND OF THE INVENTION

Liquid crystal display panels and systems are disclosed, for example, in such U.S Patents as U.S. Pat. No. 3,862,360 issued to Dill et al on Jan. 21, 1975; U.S. Pat. Nos. 3,863,332 issued to Leupp et al on Feb. 4, 1975; and 3,861,783 issued to Dill et al on Jan. 21, 1975.

In the first mentioned Dill patent, it is explained in lines 5–10 of Col. 7 that the reflective electrode used therein which contacts the liquid crystal material may be made of aluminum, nickel, chromium, gold, or silver deposited by standard evaporation or sputtering techniques. This teaching represents the standard practice of the prior art and is satisfactory for reflecting broad band or black and white images.

However, for many display applications such as watch readouts, instrument panels and the like, it is desirable to provide a colored display pattern. By means of the use of the dielectric reflector process disclosed herein, it is possible to achieve not only higher reflectivity for the reflecting electrode than is possible with the metals discussed above, but also to achieve certain desirable colors such as silver, yellowish gold, magenta red, blue and green. The particular color selected depends upon controlling the thickness of the silicon dioxide and silicon layers. The percent of reflectivity can also be further increased by the use of added sandwiched layers. The resulting display is suitable not only for use in t.v. displays but also in watches, bargraphs, etc.

While the optical properties of layers of semiconductor materials have been utilized in various other optical devices, the prior art has not recognized their value as a wavelength selective reflect electrode. In U.S. Pat. No. 3,726,585 issued to Fedotowsky on Apr. 10, 1973, there is shown, for example, a multilayer arrangement of semiconductive layers which is arranged to function as a modulator to vary the intensity of a monochromatic light beam which is passed through the multilayer arrangement near the critical angle of incidence. One of the layers acts as an optical resonator and the refractive index of the other layer is varied by application of an electrical voltage. This patent relates primarily to a general purpose electrically tunable filter rather than to the use of a particularized reflector.

Of course, anti-reflection coatings of multiple layers have been known in the prior art for some years. Such a coating is illustrated, for example, in U.S. Pat. Nos. 3,235,397 and 3,356,522.

In U.S. Pat. No. 3,679,291, there is shown a filter formed by a multilayer coating which is neutral in transmission and has asymmetric reflectance. Again, however, the filter is formed and used in a manner quite different from the reflector taught herein.

Finally, U.S. Pat. No. 3,910,033, discloses a watch dial for an analog readout watch which is covered with a transparent film of material which may be silicon dioxide, magnesium fluroide, or the like but which is preferably sapphire in order to give rise to interference between the light reflected from the front and rear surfaces of the film thereby producing interference colors. In the environment of a liquid crystal display panel, such a single film coating is not sufficient to produce either the increased reflectivity or color selectivity desired and achieved by the present invention.

It is therefore an object of this invention to provide a multilayer arrangement of thin films of dielectric material suitable for use as a reflector with liquid crystal display panels.

BRIEF DESCRIPTION OF THE DRAWINGS

This and other objects, features and advantages of the invention will be more fully apparent to those skilled in the art from the detailed description of the invention below taken in conjunction with the accompanying drawings wherein like reference characters refer to like parts throughout and in which:

FIG. 1 is a reproduction of original FIG. 2 from the above-referenced U.S. Pat. No. 3,862,360 to Dill illustrating the type of liquid crystal device in which the present invention may be used.

FIG. 2 is a sectional view of the multilayer dielectric reflector of the present invention shown as installed in a device of the type shown in FIG. 1.

DETAILED DESCRIPTION OF THE DRAWING

There is shown in FIG. 1 a reproduction of FIG. 2 in U.S. Pat. No. 3,862,360 issued to Dill et al on Jan. 21, 1975 and assigned to the same assignee as the present application. This patent discloses a liquid crystal display system having display panels in which a matrix array of reflective electrodes 36, as well as individual addressing circuitry (field effect transistors) and electrical storage circuitry (capacitor) for each cell of the display panel, are formed on a semiconductor back plate such that each reflective electrode (such as electrode 36) forms one element or plate of the capacitor for the corresponding cell. Each field effect transistor is utilized to address an associated element of the matrix array, and the associated storage capacitor maintains the applied potential across the liquid crystal material 28 in the liquid crystal cell for a period sufficient for scattering centers to be formed in the liquid crystal material. The liquid crystal cell includes the top flat glass display panel 30 having a transparent electrode layer 32 on the inner side thereof adjacent the liquid crystal material 28. A portion 66 of a semiconductor substrate supported by the backplate in turn supports a dielectric layer 68 and the reflective electrode 36. The reflective electrode 36 which contacts the liquid crystal material may be aluminum, nickel, chromium, gold, or silver deposited by standard evaporation or sputtering techniques as taught in this prior art patent. The capacitor formed under the electrode comprises the metal electrode 36 separated from an n+ doped region 15 on the silicon substrate 66 by the dielectric 68. The dielectric layer preferably is silicon dioxide ($SiO_2$) or silicon nitride ($Si_3N_4$) or a combination of both. For further details of the construction and mode of operation of such a display panel, reference is made to the text of the issued patent.

In such a device, it has been found that the metallic reflective electrode 36 may be replaced by a multilayer arrangement of deposited thin films of silicon and silicon dioxide layers as shown in detail in FIG. 2. It will be noted in FIG. 2 that reference character 30 is again used to designate the top glass display plate having the transparent electrode layer 32 thereon and that reference character 28 is again used to indicate the liquid crystal material whereas reference character 68 is again used to indicate the dielectric layer as shown in greater detail in FIG. 1.

It will be noted, however, that reflective electrode 36 is now replaced by the multilayer thin film arrangement 36a, 36b, 36c, 36d, and 36e. In this structure, as shown, the layers 36a, 36c and 36e are thin film depositions of polysilicon which has been doped with a P-type or N-type impurity such as boron or phosphorus respectively to render the layers conductive and have been joined by connecting structures or "via" members 36f and 36g penetrating the intermixed alternate layers 36b and 36d of silicon dioxide which have also been deposited in thin film layers by well known standard techniques. Of course, it will be understood that the layer 36a is first deposited. The layer 36b is next deposited. Thereafter when the layer 36c is deposited masking and etching techniques are used to first provide a hole through layer 36b so that the structure 36f may be formed when the layer 36c is deposited. The steps are repeated in sequence until a structure of the desired thickness is obtained.

It is possible to have an odd number of layers as long as the final layer is polysilicon (doped) for the transistor matrix shown which is D.C. in character and as long as the liquid crystal conducts a D.C. current. But the final layer can be $SiO_2$ if the display is operated in the A.C. mode and this last layer is used for alignment purposes.

The reflectivity of the reflector can be approximated by the relationship given below between the index of refraction (N) of the thin films respectively. The predominant wavelength or color is determined by the thickness of, and combination of the silicon and silicon dioxide layers. The reflected color is determined by selecting the thickness in accordance with Chart A below:

The present reflectivity, R, is given by the expression:

$$R = [(N_2 - N_1)/(N_2 + N_1)]^2$$

where $N_1$ is the index of refraction of the silicon layer and has a value of 3.9 to 5.4 and $N_2$ is the index of refraction of the silicon dioxide layer and has a value of 1.45. This expression gives the reflectivity for a sandwich of two layers. An increase of reflectivity is obtained by the use of additional sandwiched reflector layers.

The predominant wavelength or color is determined by the thickness of and the combination of a silicon and silicon dioxide layers in accordance with the following:

CHART A

| Observed Color | $SiO_2$ Thickness N = 1.45 | Silicon Thickness $N_1$ = 3.9 to 5.4 |
| --- | --- | --- |
| Silver | 700A° to 1200A° | 150A° to 350A° |
| Yellow | 700A° to 1200A° | 350A° to 500A° |
| Magenta (Red) | 700A° to 1200A° | 450A° to 650A° |
| Blue | 700A° to 1200A° | 600A° to 750A° |
| Green | 700A° to 1200A° | 700A° to 1000A° |

The thicknesses which produce a silver color are suitable for use as a direct replacement for the present use of chrome metallization and give a brighter image due to increased reflectivity.

What is claimed is:

1. In a liquid crystal display device for providing a display in response to control signals and video signals applied thereto, said display panel being of the type comprising a transparent electrode plate adapted for being biased to a preselected electrical potential level, a semiconductor backplate disposed adjacent to and spaced from said transparent electrode plate, reflective electrode means supported on said backplate and positioned adjacent to and spaced from said transparent electrode plate, means for confining a quantity of liquid crystal material disposed in the space between said transparent electrode plate and said reflective electrode means, and means to apply said control signals and video signals to said reflective electrode means, the improvement comprising:

said reflective electrode means comprising alternately deposited thin films of silicon and silicon dioxide layers respectively arranged in a sequence of at least one layer of each type, said silicon film containing an impurity which renders it electrically conductive.

2. A liquid crystal display device as in claim 1 wherein said thin film silicon dioxide layer has an index of refraction of approximately 1.45 and said thin film silicon layer has an index of refraction of in the range of 3.9 to 5.4.

3. A liquid crystal display device as in claim 2 wherein said silicon dioxide layer has a thickness in the range between 700 A° and 1200 A° and said silicon thin film has a thickness in the range between 150 A° to 350 A°, the observed color of the light reflected from said electrode being silver.

4. A liquid crystal display device as in claim 2 wherein said silicon dioxide thin film layer has a thickness in the range between 700 A° and 1200 A° and said silicon thin film layer has a thickness in the range between 350 A° and 500 A°, the observed color reflected from said electrode being yellow.

5. A device as in claim 2 wherein said silicon dioxide thin film layer has a thickness in the range between 700 A° and 1200 A° and said silicon thin film layer has a thickness in the range between 450 A° and 650 A°, the observed color reflected from said electrode means being red.

6. A device as in claim 2 wherein said silicon dioxide thin film layer has a thickness in the range between 700 A° and 1200 A° and said silicon thin film layer has a thickness in the range between 600 A° and 750 A°, the observed color reflected from said electrode means being blue.

7. A device as in claim 2 wherein said silicon dioxide thin film layer has a thickness in the range between 700 A° and 1200 A° and said silicon thin film layer has a thickness in the range between 700 A° and 1000 A°, the observed color reflected from said electrode means being green.

* * * * *